United States Patent
Kaslin

(10) Patent No.: US 10,088,055 B2
(45) Date of Patent: Oct. 2, 2018

(54) ELECTRIC GENERATOR FOR AN AIRCRAFT, COMPRISING A VENTILATION DEVICE WITH CONTROLLED OPENING

(71) Applicant: AIRBUS OPERATIONS (S.A.S.), Toulouse (FR)

(72) Inventor: David Kaslin, Muret (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 30 days.

(21) Appl. No.: 15/378,866

(22) Filed: Dec. 14, 2016

(65) Prior Publication Data
US 2017/0191568 A1 Jul. 6, 2017

(30) Foreign Application Priority Data
Dec. 15, 2015 (FR) ...................................... 15 62348

(51) Int. Cl.
| | |
|---|---|
| *F16K 1/20* | (2006.01) |
| *F16K 1/16* | (2006.01) |
| *B64D 41/00* | (2006.01) |
| *F16K 31/00* | (2006.01) |

(52) U.S. Cl.
CPC ............ *F16K 1/2007* (2013.01); *B64D 41/00* (2013.01); *F16K 1/165* (2013.01); *F16K 31/003* (2013.01); *Y10T 137/108* (2015.04); *Y10T 137/7891* (2015.04); *Y10T 137/7894* (2015.04)

(58) Field of Classification Search
CPC ........... Y10T 137/108; Y10T 137/1135; Y10T 137/7891; Y10T 137/7894; F16K 1/2007; F16K 1/165; F16K 31/003; B64D 41/00
See application file for complete search history.

(56) References Cited

U.S. PATENT DOCUMENTS

| | | | | |
|---|---|---|---|---|
| 4,188,780 A | * | 2/1980 | Penny ....................... | F23R 3/38 137/56 |
| 5,791,953 A | * | 8/1998 | Gunderson et al. ..... | F01N 13/12 440/89 R |
| 7,258,524 B2 | | 8/2007 | Friedel et al. | |

FOREIGN PATENT DOCUMENTS

| | | |
|---|---|---|
| DE | 20119461 U1 | 4/2003 |
| DE | 202006014877 U1 | 11/2006 |
| EP | 0417344 A1 | 3/1991 |
| EP | 1486675 A1 | 12/2004 |
| EP | 1715141 A2 | 10/2006 |
| WO | WO 2010/058478 A1 | 5/2010 |

OTHER PUBLICATIONS

French Search Report for Application No. 1562348 dated Jun. 20, 2016.

* cited by examiner

*Primary Examiner* — Kevin Lee
(74) *Attorney, Agent, or Firm* — Jenkins, Wilson, Taylor & Hunt, P.A.

(57) ABSTRACT

An electric generator for an aircraft includes a sealed casing, a rotating shaft, and a ventilation device, which has at least one orifice configured to place a chamber positioned inside the rotating shaft in communication with the exterior of the sealed casing. For at least one orifice, an inertia sealing system is configured to occupy an open state when the speed of rotation of the rotating shaft is below a given threshold, in which state the sealing system is spaced from the orifice, and a closed state when the speed of rotation of the rotating shaft is above the given threshold, in which state the sealing system seals the orifice.

9 Claims, 1 Drawing Sheet

ELECTRIC GENERATOR FOR AN AIRCRAFT, COMPRISING A VENTILATION DEVICE WITH CONTROLLED OPENING

CROSS-REFERENCE TO RELATED APPLICATION

This application claims the benefit of and priority to French patent application number 1562348, filed on Dec. 15, 2015, the entire disclosure of which is incorporated by reference herein.

TECHNICAL FIELD

The present disclosure relates to an electric generator for an aircraft, comprising a ventilation device with a controlled opening.

BACKGROUND

An electric generator for an aircraft is coupled to an aircraft engine to produce electricity. In accordance with one embodiment, the electric generator has a variable frequency. An electric generator of this type comprises, inter alia:
- a sealed casing so as to maintain a pressure close to the atmospheric pressure within the casing;
- a rotating shaft, which infiltrates the interior of the casing via an opening;
- a gasket between the rotating shaft and the casing; and
- a relief valve configured to place the interior of the casing in communication with the exterior of the casing if the pressure inside the casing exceeds a given value.

During operation, the rotating shaft has a very high speed of rotation (between 12000 and 24000 revolutions per minute, an average speed of rotation of 16000 revolutions per minute during the cruising phase). The gasket utilizes a separation effect, which tends to space the gasket slightly from the rotating shaft.

In accordance with the above, an increase of the pressure within the casing is observed flight after flight. After a certain number of flights, the relief valve opens and a flow of oil develops.

The present disclosure aims to overcome this disadvantage of the prior art.

SUMMARY

The subject matter disclosed herein relates to an electric generator for an aircraft, comprising a sealed casing and a rotating shaft and comprising a ventilation device which has:
- at least one orifice configured to place a chamber positioned inside the rotating shaft in communication with the exterior of the sealed casing;
- for at least one orifice, an inertia sealing system configured to occupy an open state when the speed of rotation of the rotating shaft is below a given threshold, in which state the sealing system is spaced from the orifice, and a closed state when the speed of rotation of the rotating shaft is above the given threshold, in which state the sealing system seals the orifice.

Because the rotating shaft has a speed of rotation above the given threshold during flight phases, the casing is perfectly tight during these flight phases. When the aircraft engine coupled to the electricity generator is stopped, the rotating shaft has a speed of rotation equal to zero, which is below the given threshold, and so the interior of the rotating shaft communicates with the exterior of the sealed casing so as to balance the pressures between the interior and the exterior of the sealed casing. The pressure inside the sealed casing therefore no longer increases flight after flight.

In accordance with a further feature, each sealing system comprises a blade of which a first end is connected to the rotating shaft and of which a second end is positioned so as to cooperate with the orifice, the blade having a geometry and/or an elasticity such that the second end of the blade is spaced from an inner surface of the rotating shaft in the open state and the second end of the blade is abutted against the inner surface of the rotating shaft in the closed state.

In accordance with a further feature, the first end of the blade is offset relative to the second end of the blade in the direction of rotation of the rotating shaft.

The blade advantageously comprises a first face oriented towards the inner surface of the rotating shaft, a second face opposite the first face, and a balance weight fixed on the second face of the blade, in the proximity of (or proximate to) the second end of the blade.

The blade preferably comprises a first face oriented towards the inner surface of the rotating shaft and an elastomer coating on the first face, at least in a zone cooperating with the orifice.

BRIEF DESCRIPTION OF THE DRAWINGS

Further features and advantages will become clear from the following description of the disclosure herein, this description being given solely by way of example, with reference to the accompanying drawings, in which.

DETAILED DESCRIPTION

Figure 1:
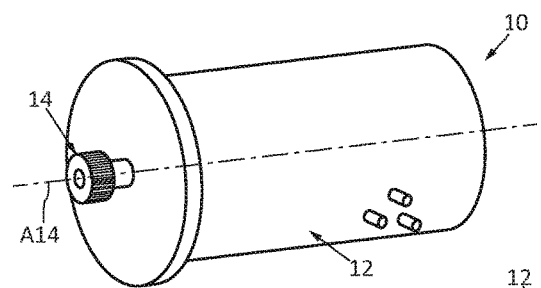
FIG. 1 is a perspective view of an electric generator for an aircraft in accordance with one embodiment.
Figure 2:
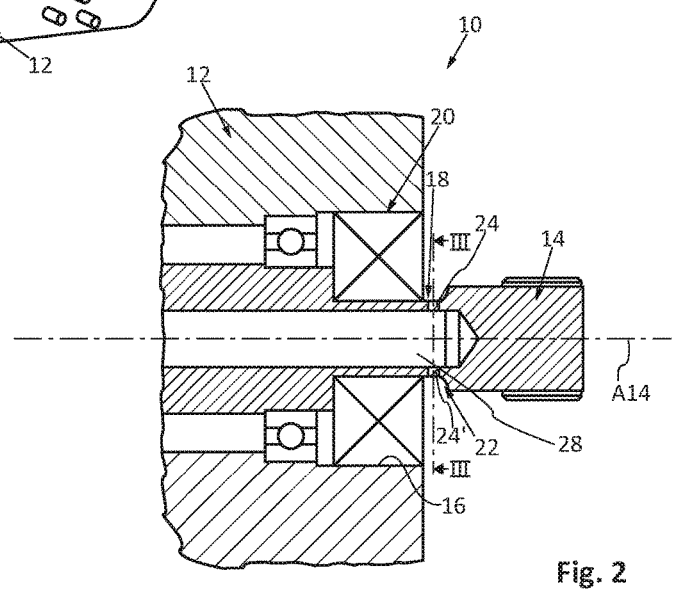
FIG. 2 is a longitudinal section of part of the electric generator visible in FIG. 1.

FIGS. 1 and 2 show an electric generator 10 of an aircraft connected to an aircraft engine in order to produce electricity. This electric generator 10 comprises a sealed casing 12 and a rotating shaft 14, which infiltrates the interior of the sealed casing 12 via an opening 16.

For the description hereinafter, the axis A14 of the rotating shaft 14 corresponds to the longitudinal direction. A longitudinal plane contains the axis A14 and a transverse plane is a plane perpendicular to the axis A14. A radial direction is perpendicular to the axis A14.

The rotating shaft 14 comprises an outer surface 18 positioned outside the sealed casing 12.

The electric generator 10 comprises a gasket 20 positioned between the rotating shaft 14 and the sealed casing 12.

In accordance with a feature of the subject matter herein, the electric generator 10 comprises a ventilation device 22, which has:
- at least one orifice 24 configured to place the interior of the rotating shaft 14 in communication with the exterior of the sealed casing 12 of the electric generator 10, for at least one orifice 24, an inertia sealing system 26 configured to occupy an open state, visible in FIG. 3A, when the speed of rotation of the rotating shaft 14 is below a given threshold, in which state the sealing system 26 is spaced from the orifice 24 and allows a fluid to flow through the orifice 24, and a closed state, visible in FIG. 3B, when the speed of rotation of the rotating shaft 14 is above the given threshold, in which state the sealing system 26 seals the orifice 24.

Because the rotating shaft 14 has a speed of rotation greater than the given threshold during the phases of operation of the engine of the aircraft, the casing 12 is kept at a pressure greater than or equal to the exterior pressure during the flight phases. When the engine of the aircraft is stopped, the rotating shaft 14 is stopped and therefore has a speed of rotation below the given threshold, and so the interior of the rotating shaft 14 communicates with the exterior of the sealed casing 12 so as to balance the pressures between the interior and the exterior of the sealed casing 12. Thus, the pressure inside the sealed casing 12 no longer rises flight after flight.

In accordance with one embodiment, the rotating shaft 14 comprises a chamber 28 positioned inside the rotating shaft 14, which chamber communicates with the interior of the sealed casing 12. At least one orifice 24 connects the chamber 28 and the outer surface 18 of the rotating shaft 14.

Each orifice 24 is positioned so as to lead outside the sealed casing 12.

The ventilation device 22 preferably comprises as many sealing systems 26 as orifices 24.

Figure 3A:
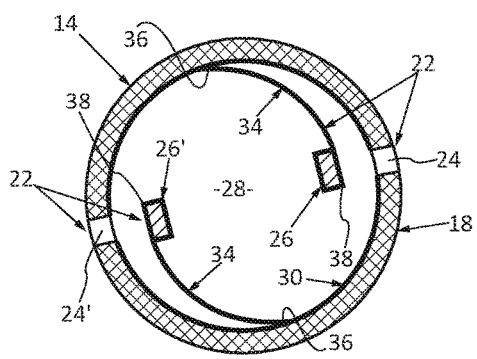
FIGS. 3A and 3B are cross sections of a rotating shaft provided with a ventilation device, illustrating an embodiment of the subject matter herein in the open state and the closed state respectively.
Figure 3B:
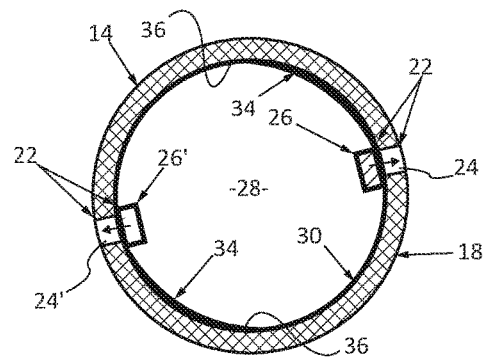
Figure 4:
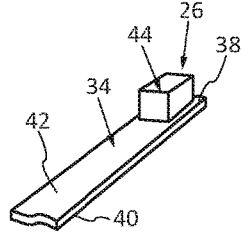
FIG. 4 is a perspective view of part of a sealing system illustrating an embodiment of the subject matter herein.

In accordance with an embodiment illustrated in FIGS. 3A and 3B, the ventilation device 22 comprises two diametrically opposed orifices 24, 24' of which the axes are perpendicular to the longitudinal direction.

Figure 5:
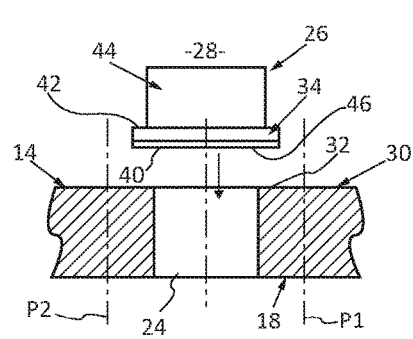
FIG. 5 is a longitudinal section of part of the rotating shaft and of a ventilation device in the open state, illustrating an embodiment of the subject matter herein.

The chamber 28 comprises or is delimited by a cylindrical inner surface 30 with an axis coaxial to the axis A14 of the rotating shaft 14 extending between at least two transverse planes P1 and P2 (visible in FIG. 5) disposed on either side of the orifice or orifices 24, 24'.

The chamber 28 has a diameter greater than the diameters of the orifices 24, 24'. In order to give an order of magnitude, the diameter of the chamber 28 is at least five times greater than that of the orifices 24, 24'.

Each orifice 24 comprises an edge in the form of a cylinder portion. This edge will be referred to as a seat 32 throughout the rest of the description.

In accordance with one embodiment, each sealing system 26 comprises, in the chamber 28, an elastically deformable blade 34 of which a first end 36 is connected to the rotating shaft 14, more particularly to the inner surface 30 of the rotating shaft 14, and of which a second end 38 is positioned so as to cooperate with the seat 32 of the orifice 24 in the closed state in order to seal said orifice.

The blade 34 has a geometry and/or an elasticity such that the second end 38 is spaced from the inner surface 30 of the rotating shaft 14 in the open state and is abutted against the inner surface 30 of the rotating shaft 14 in the closed state.

In accordance with one embodiment, the blade 34 is made of spring steel.

In accordance with a further feature, the first end 36 of the blade 34 is offset relative to the second end 38 of the blade 34 in accordance with the direction of rotation of the rotating shaft 14.

The blade 34 comprises a first face 40 oriented towards the inner surface 30 of the rotating shaft 14 and a second face 42, which is opposite the first face 40, oriented towards the center of the chamber 28.

The thickness of the blade 34 corresponds to the dimension of the blade 34 in the radial direction, which also corresponds to the distance separating the first and second faces 40 and 42. The width of the blade 34 corresponds to the dimension of the blade 34 in the longitudinal direction, and the length of the blade 34 corresponds to the dimension of the blade 34 considered over the circumference of the rotating shaft 14.

The blade 34 has a width to thickness ratio greater than 5. The blade 34 has a length substantially greater than its width.

The blade 34 preferably comprises a balance weight 44 fixed on the second face 42 of the blades 34, in the proximity of (or proximate to) the second end 38 of the blade 34, in order to increase the force of the pressure of the blade 34 on the seat 32 and thus improve the tightness.

The blade 34 advantageously comprises an elastomer coating 46 on the first face 40, at least in a zone cooperating with the seat 32 of the orifice 24, in order to improve the tightness.

While at least one exemplary embodiment of the present invention(s) has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a", "an" or "one" do not exclude a plural number. Furthermore, characteristics or steps which have been described with reference to one of the above exemplary embodiments may also be used in combination with other characteristics or steps of other exemplary embodiments described above.

The invention claimed is:

1. An electric generator for an aircraft, comprising:
   a sealed casing;
   a rotating shaft; and
   a ventilation device, the ventilation device comprising:
      at least one orifice configured to place a chamber positioned inside the rotating shaft in communication with an exterior of the sealed casing;
      for at least one orifice, an inertia sealing system configured to occupy an open state when a speed of rotation of the rotating shaft is below a given threshold, in which state the sealing system is spaced from the orifice, and a closed state when the speed of rotation of the rotating shaft is above the given threshold, in which state the sealing system seals the orifice,
   wherein each sealing system comprises a blade of which a first end is connected to the rotating shaft and of which a second end is positioned to cooperate with the orifice, and
   wherein the first end of the blade is offset relative to the second end of the blade in a direction of rotation of the rotating shaft.

2. The electric generator according to claim 1, wherein the blade has a geometry and/or an elasticity such that the second end of the blade is spaced from an inner surface of the rotating shaft in the open state and the second end of the blade is abutted against the inner surface of the rotating shaft in the closed state.

3. The electric generator according to claim 1, wherein the blade comprises a first face oriented towards inner surface of the rotating shaft, a second face opposite the first face, and a balance weight fixed to the second face of the blade, proximate to the second end of the blade.

4. The electric generator according to claim 1, wherein the blade comprises a first face oriented towards inner surface of the rotating shaft and an elastomer coating on the first face, at least in a zone cooperating with the orifice.

5. The electric generator according to claim 2, wherein the blade comprises a first face oriented towards the inner surface of the rotating shaft, a second face opposite the first face, and a balance weight fixed to the second face of the blade, proximate to the second end of the blade.

6. The electric generator according to claim 5, wherein the blade comprises a first face oriented towards the inner surface of the rotating shaft and an elastomer coating on the first face, at least in a zone cooperating with the orifice.

7. The electric generator according to claim 2, wherein the blade comprises a first face oriented towards the inner surface of the rotating shaft and an elastomer coating on the first face, at least in a zone cooperating with the orifice.

8. An electric generator for an aircraft, comprising:
    a sealed casing;
    a rotating shaft; and
    a ventilation device, wherein the ventilation device comprises:
        at least one orifice configured to place a chamber positioned inside the rotating shaft in communication with an exterior of the sealed casing;
        for at least one orifice, an inertia sealing system configured to occupy an open state when a speed of rotation of the rotating shaft is below a given threshold, in which state the sealing system is spaced from the orifice, and a closed state when the speed of rotation of the rotating shaft is above the given threshold, in which state the sealing system seals the orifice,
    wherein each sealing system comprises a blade of which a first end is connected to the rotating shaft and of which a second end is positioned to cooperate with the orifice, the blade having a geometry and/or an elasticity such that the second end of the blade is spaced from an inner surface of the rotating shaft in the open state and the second end of the blade is abutted against the inner surface of the rotating shaft in the closed state, and
    wherein the blade comprises a first face oriented towards the inner surface of the rotating shaft, a second face opposite the first face, and a balance weight fixed to the second face of the blade, proximate to the second end of the blade.

9. The electric generator according to claim 8, wherein the blade comprises a first face oriented towards the inner surface of the rotating shaft and an elastomer coating on the first face, at least in a zone cooperating with the orifice.

\* \* \* \* \*